United States Patent
Jakubowski, Jr. et al.

(10) Patent No.: US 6,663,049 B1
(45) Date of Patent: Dec. 16, 2003

(54) INTEGRAL ENERGY SOURCE FOR STORE EJECTION

(75) Inventors: Thaddeus Jakubowski, Jr., St. Charles, MO (US); Nelson O. Weber, High Ridge, MO (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/210,006

(22) Filed: Jul. 31, 2002

(51) Int. Cl.[7] .................................................. B64D 1/12
(52) U.S. Cl. .................... 244/137.4; 89/1.51; 244/139; 244/137.1
(58) Field of Search ................. 89/1.54, 1.58, 89/1.59, 1.57, 1.51, 2; 244/137.1, 137.4, 139

(56) References Cited

U.S. PATENT DOCUMENTS

| | | |
|---|---|---|
| 3,787,012 A | 1/1974 | Jakubowski, Jr. |
| 3,887,150 A | 6/1975 | Jakubowski, Jr. |
| 4,043,525 A | 8/1977 | Jakubowski, Jr. |
| 4,095,762 A | 6/1978 | Holt |
| 4,204,456 A | 5/1980 | Ward |
| 4,347,777 A | 9/1982 | Jakubowski, Jr. et al. |
| 4,552,327 A * | 11/1985 | Carter .................... 244/137.4 |
| 4,746,083 A * | 5/1988 | Dupin et al. ............. 244/137.4 |
| 4,905,568 A | 3/1990 | Hetzer et al. |
| 5,238,209 A * | 8/1993 | Hornyak .................... 89/1.57 |
| 5,409,187 A * | 4/1995 | Dunham .................... 244/139 |
| 5,411,225 A * | 5/1995 | Lannon et al. ........... 244/137.1 |
| 5,583,312 A | 12/1996 | Jakubowski, Jr. |
| 5,857,647 A * | 1/1999 | Jakubowski, Jr. ........ 244/137.4 |
| 5,907,118 A | 5/1999 | Jakubowski, Jr. et al. |
| 6,035,759 A | 3/2000 | Jakubowski, Jr. et al. |
| 6,347,768 B1 * | 2/2002 | Jakubowski et al. ..... 244/137.4 |

OTHER PUBLICATIONS

Ed Mygland; Pneumatic Ejector Release Unit; Proceedings 8th JOCG Aircraft/Stores Compatibility Symposium, Oct. 23–25, 1990; pp. 32–14, 32–15 and 32–16; Fort Walton Beach, Florida.

* cited by examiner

*Primary Examiner*—Charles T. Jordan
*Assistant Examiner*—L. Semunegus
(74) *Attorney, Agent, or Firm*—Alston & Bird LLP

(57) ABSTRACT

There is provided a store ejection system, store, and method for mounting a jettisonable store on an aircraft. The system uses a pressurized non-pyrotechnic fluid from a pressure vessel integral to the store and sealed by a releasable seal as the source of energy and the transfer mechanism. An actuation system includes an accumulator for receiving and storing the fluid from the pressure vessel, a dump valve for controlling a flow of the fluid from the accumulator, and a controller for actuating the dump valve to an open position in response to a control signal to jettison the store. The seal is configured to hermetically seal the pressure vessel before the actuation system is connected to the pressure vessel, and the actuation system is configured to be fluidly connected to the pressure vessel upon release of the releasable seal. A pneumatically-driven jettison mechanism for releasably retaining the store is fluidly connected to the dump valve such that actuating the dump valve to the open position releases the pressurized fluid in the accumulator to flow to the jettison mechanism, thereby actuating the jettison mechanism to jettison the store.

29 Claims, 3 Drawing Sheets

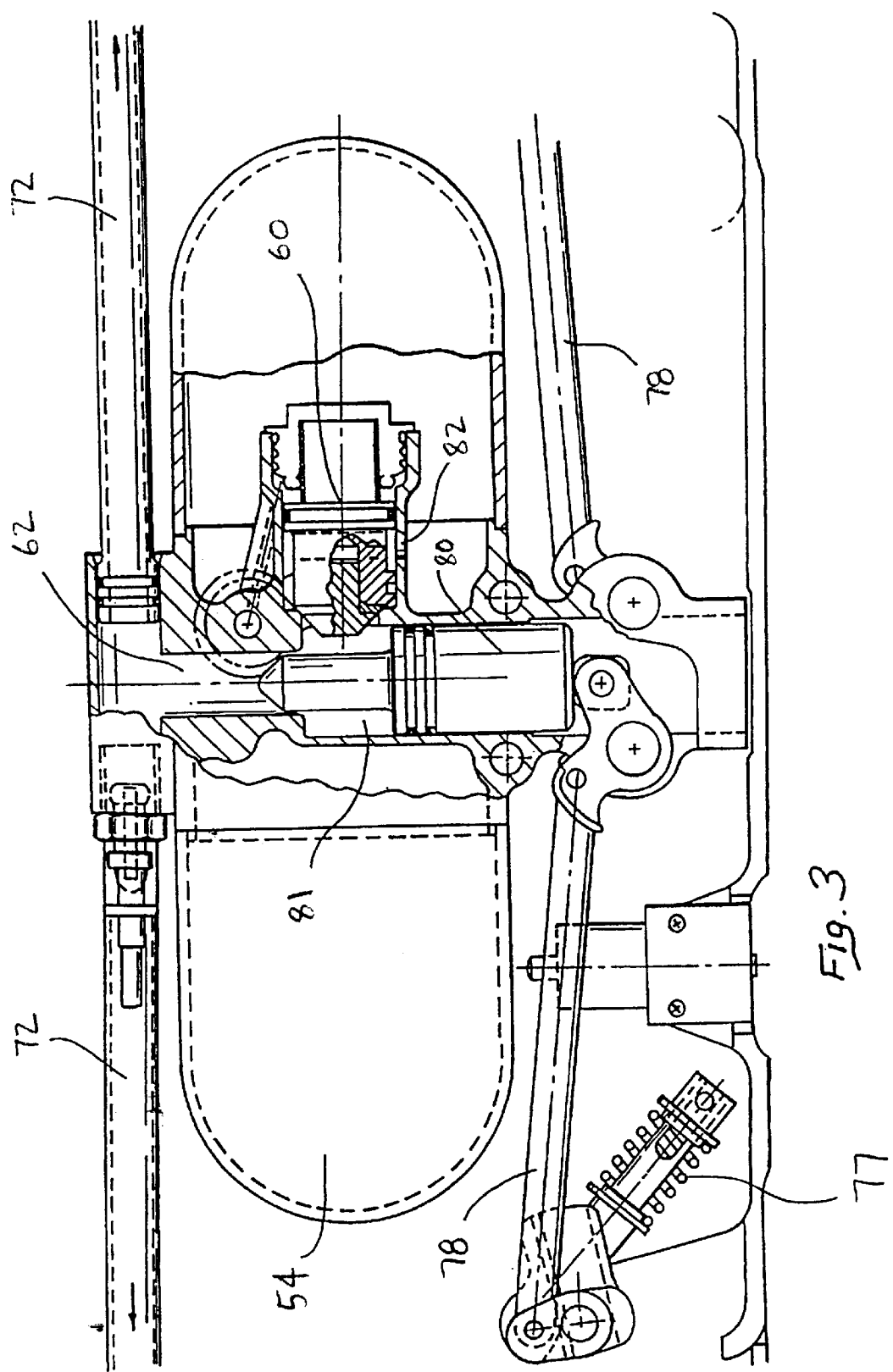

INTEGRAL ENERGY SOURCE FOR STORE EJECTION

BACKGROUND OF THE INVENTION

1) Field of the Invention

The present invention relates to releasable stores that are mounted on an aircraft and, more particularly, to a store ejection system, store, and associated method that use a pressure vessel integral to the store as an energy source for ejecting the store from the aircraft.

2) Description of Related Art

The term "store" is used herein to refer generally to any of a number of munitions or other materials that can be dispensed from an aircraft. For example, military aircraft can include a store ejection system to dispense bombs, missiles, rockets, and other types of munitions. Non-munitions stores can include electronic equipment and other materials. Typically, the store ejection system includes one or more racks beneath the wings or fuselage of the aircraft for holding the stores and releasing the stores upon a command. For example, store racks are described in U.S. Pat. Nos. 5,907,118 and 6,035,759, both by the same inventor and assignee as the present invention.

In one conventional store ejection system, the stores are connected to the racks by one or more mechanical hooks. The store ejection system includes a release mechanism for actuating the hooks to release the stores and a jettison mechanism for forcibly ejecting the stores away from the aircraft. The jettison mechanism can include a pressure-actuator, such as a ram that is actuated by a pressure increase in a cylinder. In the conventional system, the pressure is generated by a pyrotechnic cartridge, i.e., an explosive. Ignition of the pyrotechnic cartridge initiates a chemical reaction that generates a high pressure, which can be used for actuating the release mechanism and the jettison mechanism.

Although such pyrotechnic cartridges provide a weight efficient unit for storing and releasing energy, the cartridges present a number of maintenance, reliability, and safety concerns. For example, the chemical reaction of the explosive charge in the cartridge generates a large amount of residue. Some of the residue is deposited in the ejection system where it can clog or otherwise interfere with the components of the ejection system. Moisture and corrosives in the residue can also damage the ejection system. Additionally, moisture deposited in the ejection system can freeze or gather additional debris. To avoid unreliability and possible failure, the ejection system must be disassembled and cleaned regularly, thus increasing the cost and downtime for maintaining the system. Such cleaning often requires the use of hazardous cleaning solvents that require care in storage, use, handling, and disposal. Further, due to the pyrotechnic nature of the cartridges, special storage and handling precautions for the cartridges are necessary. For example, ground crew personnel must use special equipment to conduct stray voltage checks before installing the cartridges to prevent inadvertent firing. Also, unspent cartridges must be removed before unloading unreleased stores from the aircraft.

Non-pyrotechnic ejection systems have been proposed, such as the pneumatically-driven store ejection system described in U.S. Pat. No. 5,583,312, which is also by the same inventor and assignee as the present invention. That device does not require pyrotechnic cartridges, but instead includes a compressor for compressing a non-pyrotechnic gas that is then used to actuate ejector pistons of one or more suspension and release equipment (S & RE) modules that releasably retain and jettison stores. The pressurized gas, which can comprise ambient air, does not deposit a significant amount of residue on the system components. Thus, the residue build-up and corrosion resulting from pyrotechnic chemicals are eliminated and the maintenance required on the system is minimized. However, the compressor adds to the initial cost of the system and the recurring costs for overhauling and maintaining the compressor. The compressor also adds to the overall weight of the system. Further, the compressor requires the availability of sufficient power from the aircraft's electrical or hydraulic systems to drive the compressor motor. In addition, the compressor must generate sufficient pressure to release the stores, so the compressor requires an interval of time for preparing the release of the store. The time required to achieve a sufficient pressure is dependent on the compressor, the number and size of ejector racks that are connected to the system, and the air density, which varies with altitude. Therefore, the release of the stores can be delayed while the compressor generates the required pressure.

There have also been proposed ejector devices that use a stored volume of compressed gas to provide the energy for ejection. For example, U.S. Pat. Nos. 4,095,762 and 4,905,568 to Holt and Hetzer et al., respectively, each describe an ejector mechanism that uses a pressurized gas as the energy source for ejection and a hydraulic fluid, which acts as the energy transfer mechanism for ejection. Both patents describe that the hydraulic fluid can be used to re-pressurize the gas after ejection. Holt specifies that the action of recocking a piston moves the hydraulic fluid and thereby re-pressurizes the gas. Hetzer recites that after ejection, a pump is used to pump the hydraulic fluid, and the hydraulic fluid thereby acts on the gas to re-pressurize it. Therefore, neither patent requires a compressor for re-pressurizing the gas. However, the hydraulic systems add weight and complexity to the system. Further, the pump of Hetzer for pumping the hydraulic fluid adds weight, power, and timing concerns similar to those discussed above in connection with the compressor of U.S. Pat. No. 5,583,312. Similarly, in the case of Holt, some additional device would be required for recocking the system.

U.S. Pat. No. 4,204,456 to Ward discloses a pneumatic bomb ejector that uses a pressurized gas from a storage container for the energy required to eject the bomb. However, no specific storage container is described, and there is no description regarding how and when the storage container is pressurized. Pressurizing the container during flight would require a pressurization device, such as a compressor, again with the weight, power, and timing concerns noted above. Alternatively, if the storage container is pre-pressurized before the aircraft takes off so that no on-board compressor is needed, the pressure in the storage container will fluctuate as the temperature of the gas in the storage container changes with the ambient temperature. Further, the pressure in the storage container will not be affected by changes in the ambient pressure. Thus, the differential in pressure between the storage container and the ambient air will change as the aircraft changes altitude, thereby changing the operational characteristics of the ejector and possibly resulting in incorrect or failed ejections. Additionally, refilling the container before take-off would require that the container be connected to a refilling device, which could delay the flight.

Thus, there is a need for a store ejection system and method that use a non-pyrotechnic gas as the source of energy and transfer mechanism for jettisoning a store from an aircraft. The system should not require the use of pyrotechnic reactions or an on-board compressor system. Preferably, the system should not require a long time delay to achieve pressurization. Additionally, the system should require little or no power from the aircraft's electrical or hydraulic systems for pressurizing the gas.

BRIEF SUMMARY OF THE INVENTION

The present invention provides an improved store ejection system for mounting a jettisonable store on an aircraft. The system includes a pressure vessel integral to the store, which is capable of holding a pressurized non-pyrotechnic fluid for providing the source of energy and the transfer mechanism. For example, the pressure vessel can define an interior space of between about 20 and 50 cubic inches and can be pressurized to between about 3,000 and 10,000 psi. A releasable seal, including a valve or a burst portion, is configured to hermetically and releasably seal the pressure vessel. An actuation system includes an accumulator releasably connected to the pressure vessel for receiving and storing the fluid from the pressure vessel, a dump valve for controlling a flow of fluid from the accumulator, and a controller for actuating the dump valve to an open position in response to a control signal to jettison the store. A pneumatically-driven jettison mechanism releasably retains the store. The jettison mechanism is fluidly connected to the dump valve such that actuating the dump valve to the open position releases the pressurized fluid in the accumulator to flow to the jettison mechanism, thereby actuating the jettison mechanism to jettison the store.

The releasable seal is configured to hermetically seal the pressure vessel before the actuation system is connected to the pressure vessel. Upon release of the releasable seal, the actuation system is fluidly connected to the pressure vessel. For example, the seal can be released by an actuator that is actuated by a controller. The jettison mechanism can include at least one hook for releasably retaining the store and at least one ejector piston for forcibly jettisoning the store away from the aircraft when the hook has been actuated to a release position. The hook and the ejector piston are actuated by the pressurized fluid exiting the accumulator through the dump valve. A store present switch can be configured to detect if a store is retained by the jettison mechanism and to transmit a signal to a controller to indicate if a store is present. A relief valve can be configured to vent the fluid from the accumulator to reduce the pressure in the accumulator to below a maximum operating pressure.

According to one aspect of the invention, a quick disconnect connection device releasably and fluidly connects the pressure vessel to the actuation system. The connection device can include a flexible tube for fluidly connecting the pressure vessel to the accumulator and an electrical conductor for providing electrical communication between the aircraft and the store.

The present invention also provides a store configured to be jettisoned from an aircraft using a fluid as the source of energy and the transfer mechanism. The store includes a pressure vessel that is integral to the store and capable of holding a pressurized non-pyrotechnic fluid for providing the source of energy and the transfer mechanism. For example, the pressure vessel can define an interior space of between about 20 and 50 cubic inches, and the fluid in the pressure vessel can be compressed to between about 3,000 and 10,000 psi. A releasable seal, such as a valve or burst portion, is configured to hermetically and releasably seal the pressure vessel. The store is configured to be connected to the aircraft such that upon release of the releasable seal, the pressure vessel is fluidly connected to an actuation system of the aircraft and the fluid flows from the pressure vessel to the actuation system. According to one aspect of the invention, an actuator is configured to release the releasable seal. The actuator can be connected to the aircraft by an electrical connection that is configured to be connected to a quick disconnect connection device. A pneumatic connection can also be configured to be connected to the quick disconnect connection device for fluidly connecting the pressure vessel to the aircraft.

The present invention also provides a method of jettisoning a store from an aircraft using a pressurized non-pyrotechnic fluid from the store as the source of energy and the transfer mechanism. The method includes releasably retaining the store with at least one pneumatically-driven jettison mechanism and releasably and fluidly connecting an actuation system to a pressure vessel of the store. The pressure vessel can be pressurized before being connected to the accumulator and hermetically sealed with the releasable seal. The releasable seal is released, for example, by communicating an arm control signal to a controller, which responds by destructively releasing a burst portion of the releasable seal so that the pressure vessel is fluidly connected to the accumulator. The accumulator is fluidly connected to the jettison mechanism by actuating a dump valve to an open position. The dump valve is fluidly connected to the accumulator such that opening the valve allows fluid to flow from the accumulator to the jettison mechanism and actuate the jettison mechanism to jettison the store with the integral pressure vessel. A relief valve fluidly connected to the accumulator can be opened to vent the fluid from the accumulator when an over-pressure condition is detected in the accumulator or when it is desired to disarm the jettison mechanism.

According to one aspect of the invention, the store is releasably retained with at least one hook, which is actuated to an open position to release the store. The accumulator can also be connected to at least one ejector piston so that the fluid flowing from the accumulator actuates the piston to jettison the store.

Thus, the present invention provides a store ejection system, store, and method that use a non-pyrotechnic fluid as the source of energy and transfer mechanism for jettisoning the store from an aircraft. According to one aspect of the invention, the pressure vessel is integral to the store and does not require power from the aircraft's electrical or hydraulic systems for pressurizing the fluid. According to another aspect, the integral pressure vessel provides the pressurized fluid to the ejection system without requiring a long time delay to achieve pressurization and without requiring the use of pyrotechnic reactions or an on-board compressor or storage container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is an enlarged, partially cut-away side view of the actuation system of the S & RE module of FIG. 2.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
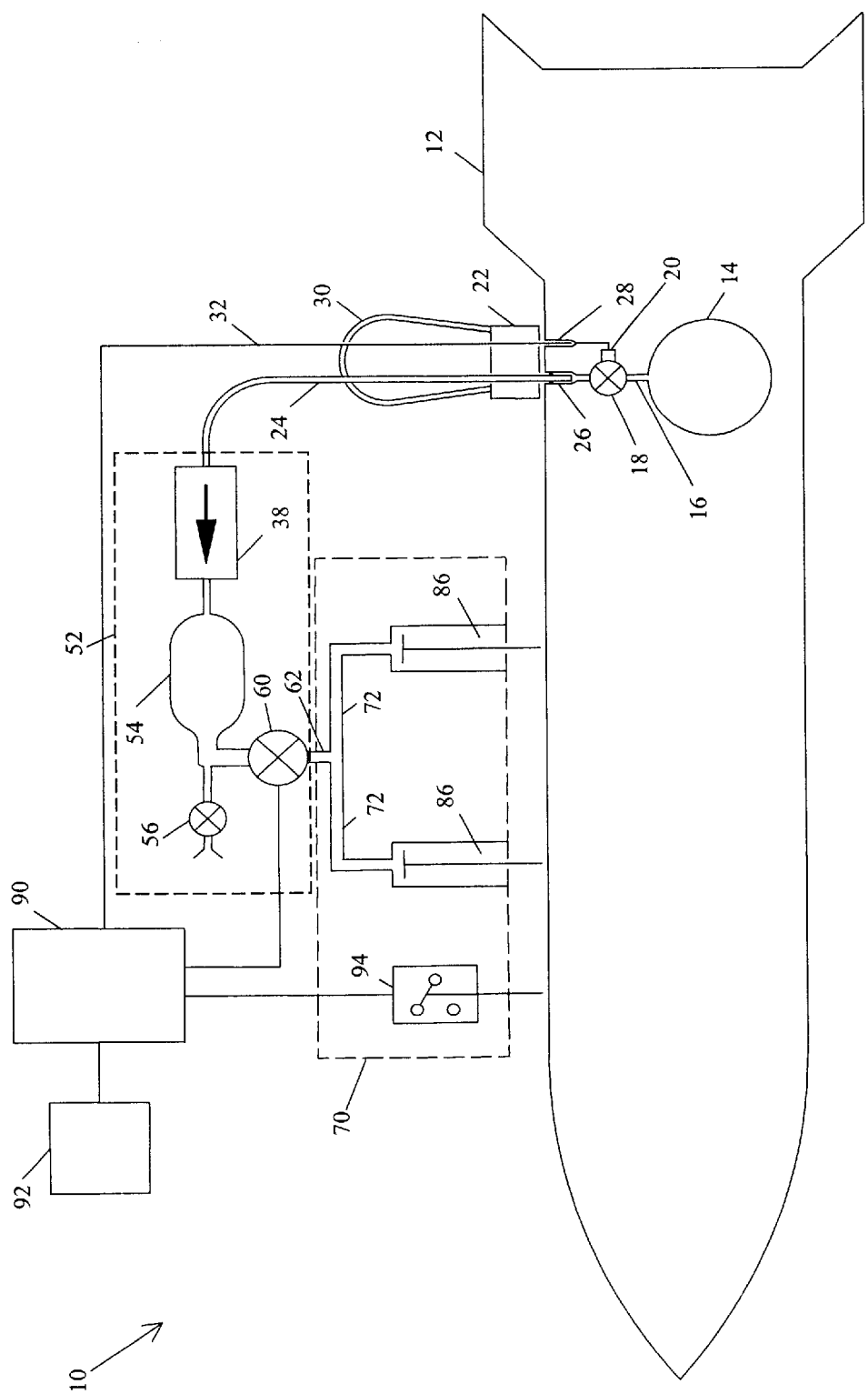
FIG. 1 is schematic view of the store ejection system according to one embodiment of the present invention.

Referring now to FIG. 1, there is shown a pneumatically-driven store ejection system 10 according to one embodiment of the present invention. The ejection system 10 is used to releasably mount a jettisonable store 12 on an aircraft (not shown). The store 12 can comprise any object that is to be released from the aircraft, including munitions such as bombs, missiles, rockets, and the like, and non-munitions such as surveillance, communication, or avionic devices. The store 12 includes a pressure vessel 14 which can be connected to an actuation system 52 and a pneumatically-driven jettison mechanism 70 on the aircraft. A releasable seal 18, which hermetically seals the pressure vessel 14, can be released so that the pressure vessel 14 is fluidly connected to the actuation system 52. A controller 90 actuates the actuation system 52 to jettison the store 12.

The pressure vessel 14 of the store 12 defines an internal space for holding a volume of pressurized non-pyrotechnic fluid, which provides the source of energy and the transfer mechanism for the ejection system 10. Preferably, the pressure vessel 14 is filled with air, nitrogen, or other non-pyrotechnic gases during the manufacture of the store 12 so that the ground crew does not need to fill the pressure vessel 14 when the store 12 is loaded onto the aircraft. The pressure vessel 14 can be pressurized using a high pressure fluid source (not shown) such as a pressurized tank, a compressor, a pump, a gas generator, or other known filling means. The pressure vessel 14 can be connected to the high pressure fluid source via an outlet 16 provided on the pressure vessel 14, or a fill port (not shown) can be provided. The energy of the pressurized fluid in the pressure vessel 14 is dependent on both the volume of the vessel 14 and the pressure of the fluid, both of which can be designed according to the particular needs of the ejection system 10. In one embodiment, the volume of the pressure vessel 14 is between about 20 and 50 cubic inches, and the pressure is between about 3,000 and 10,000 psi.

A connection device 22 releasably connects the pressure vessel 14 to the actuation system 52 such that the pressure vessel 14 can be removed from the ejection system 10, for example, when the store 12 is ejected from the aircraft. The connection device includes a feed line 24 that fluidly connects the outlet 16 of the pressure vessel 14 to the actuation system 52 via a pneumatic connection 26. Preferably, at least a portion of the feed line 24 is flexible to facilitate the positioning of the connection device 22 when connecting the connection device 22 to the store 12. The connection device 22 can also include at least one electrical communication line 32, such as a conductive wire, that connects the store 12 to the aircraft through an electrical connection 28. For example, the connection device 22 can include a conductive wire for carrying communication signals between the aircraft and the store 12 and a ground wire (not shown) that acts as a ground path for the communication signals. Preferably, the connection device 22 is a quick disconnect connection device, i.e., a connection device that can be quickly disconnected from the store 12. A lanyard 30 or other retaining device connects the connection device 22 to the aircraft so that the connection device is disconnected from the store 12 as the store 12 is jettisoned from the aircraft.

The outlet 16 of the pressure vessel 14 is hermetically sealed by the releasable seal 18 such that the releasable seal 18 retains the fluid in the pressure vessel 14 until the releasable seal 18 is released. The releasable seal 18 is fluidly connected to the pressure vessel 14 and the actuation system 52 such that the pressure vessel 14 is fluidly connected to the actuation system 52 only when the releasable seal 18 is open. The releasable seal 18 can comprise a resealable seal, i.e., a seal that can be released to the open position and then resealed to a closed position, such as a valve. Preferably, the releasable seal 18 comprises a non-resealable seal, i.e., a seal that must be replaced in order to re-seal the pressure vessel 14. For example, the releasable seal 18 can comprise a burst disk, which includes a portion of burstable material. The burst disk is released by destructively releasing the burstable material, for example, by bursting, puncturing, stretching, cutting, burning, or otherwise destroying the burstable material. Typically, the burstable material is destroyed when the burst disk is released. An actuator 20 can be configured to open the pressure vessel 14, for example, by releasing the valve or burst disk. The actuator 20 can release the seal 18 by mechanical reconfiguration or by other known techniques. In one embodiment, the actuator 20 comprises an electrical device such as a solenoid that is controlled by the controller 90 via the electrical connection line 32. In one embodiment, the controller 90 is configured to receive an arm control signal, and respond by actuating the actuator 20 to release the seal 18. Thus, the releasable seal 18 is configured to keep the pressure vessel 14 hermetically sealed until at least a time when the store 12 is retained by the ejection system 10 and the pressure vessel 14 is connected to the actuation system 52. Preferably, the actuator 20 releases the seal 18 shortly before jettison of the store 12, for example, after a decision has been made to eject the store 12.

Figure 2:
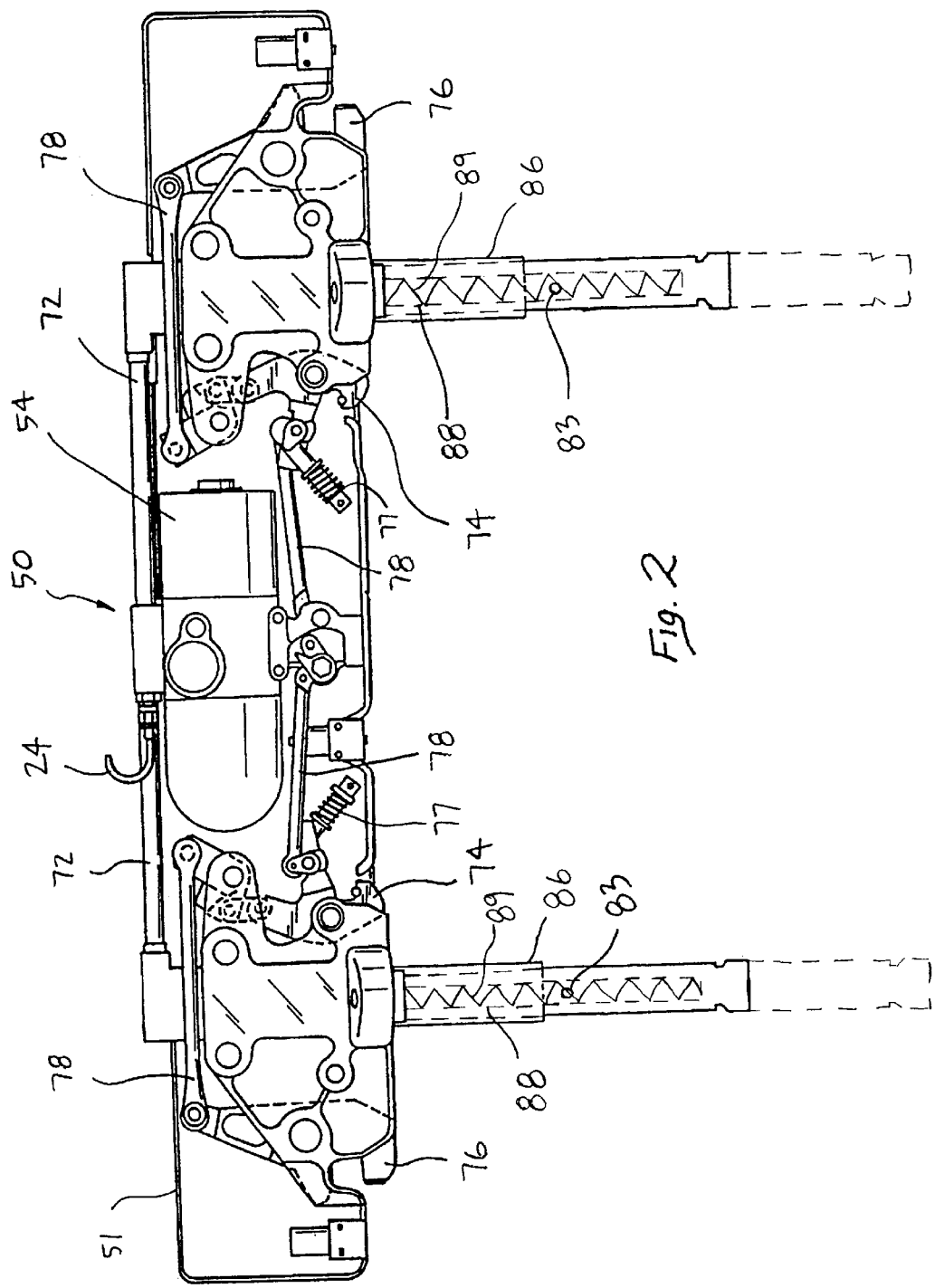
FIG. 2 is a partially cut-away side view of a suspension and release equipment (S & RE) module including an actuation system and an ejection mechanism according to one embodiment of the present invention and showing the range of motion of two ejector pistons.

The ejection system 10 illustrated in FIG. 1 includes one actuation system 52 and one jettison mechanism 70. The actuation system 52 and jettison mechanism 70 can comprise, in combination, a suspension and release equipment (S & RE) module 50, similar to the S & RE module discussed in U.S. Pat. No. 5,583,312, the entirety of which is herein incorporated by reference. Preferably, the ejection system 10 minimizes the changes necessary to adapt the present invention to commercially available S & RE modules. As shown in FIG. 2, the actuation system 52 and the jettison mechanism 70 are housed in a housing 51 for compactness and modularity, but various arrangements could be employed within the scope of the invention, including arrangements wherein some or all of the elements are housed within the aircraft remote from the housing 51.

As shown in FIG. 2, the pneumatically-driven jettison mechanism 70 is configured to releasably retain and jettison the store 12. The store 12 is retained by hooks 74, 76, but other retention mechanisms can also be employed including other configurations of one or more hooks, straps, clamps, magnets, and the like. Ejector pistons 86, each of which can be retracted and extended, are used to thrust the store 12 away from the aircraft. For example, each ejector piston 86 can have multiple telescopic portions that define a common passage 88 therethrough that when filled with pressurized fluid causes the piston 86 to extend. The fluid is released from the pistons through vent ports 83 after extension, and the pistons 86 can be biased to the retracted configuration, for example, by one or more springs 89 so that the pistons 86 automatically retract when de-pressurized. Alternatively, the pistons 86 can be retracted manually or by other mechanisms, either before or after the aircraft has returned from its flight.

The actuation system 52 includes an accumulator 54, an ejection dump valve 60, and a relief valve 56. The accumulator 54 is fluidly connected to the pressure vessel 14 via the feed line 24. A check valve 38 is provided in the feed line 24 to control the flow of fluid from the pressure vessel 14 to the actuation system 52. The dump valve 60 is fluidly connected to the ejector pistons 86 of the jettison mechanism 70 via a dump valve exit line 62 and dump passages 72, which fluidly connect, for example, to the passages 88. Thus, the ejector pistons 86 can be actuated by releasing fluid from the dump valve 60 through the dump valve exit line 62 and the dump passages 72.

Inside hooks 74 and outside hooks 76 of a type known in the art are preferably employed to releasably secure the store 12 to the jettison mechanism 70. The hooks 74, 76 can be actuated from an illustrated closed position to an open position by means of a hinged hook opening linkage 78, as is also well known in the art, which in turn is driven by a hook opening piston 80 that is reciprocallably slidable in a piston chamber 81, shown in FIG. 3. The hook opening piston 80 is reciprocatingly driven when the dump valve 60 is adjusted from the illustrated closed position to an open position, thereby permitting pressurized fluid from the accumulator 54 to travel through port 82 into the piston chamber 81, thus acting to drive the piston 80 reciprocatingly downwardly to actuate the hook opening linkage 78. At the same time, pressurized fluid is also permitted by the open dump valve 60 to flow through the dump valve exit line 62 and into the dump passages 72, thereby actuating the ejector pistons 86 to thrust the store 12 away from the aircraft simultaneously with its release from the hooks 74, 76. Springs 77 can be provided for biasing the hook opening linkage 78, and thus the hooks 74, 76, to the open and/or closed position.

In one exemplary manner of operation of the present invention, the S & RE module 50 is initially in an unpressurized state. Loading of a store 12 onto the jettison mechanism 70 of the S & RE module 50 triggers a store present switch 94 in electrical communication with the controller 90, and the store present switch 94 communicates a "store present" signal to the controller 90. After a decision to jettison the store 12 has been made, the controller 90 actuates the actuator 20 to release the releasable seal 18. Upon release of the releasable seal 18, fluid flows from the pressure vessel 14 through the feed line 24 to the accumulator 54.

The relief valve 56 controls the pressure in the accumulator 54 by venting fluid from the accumulator 54 if an over-pressure condition exists in the accumulator 54, e.g., if the pressure in the accumulator 54 exceeds an operating pressure, which is approximately 5,000 psi in one preferred embodiment. The operating pressure can be defined by a range of pressures extending between minimum and maximum operating pressures, e.g., between 4,000 psi and 6,000 psi, and the operating pressure can be measured as an absolute pressure or as a function of the ambient pressure. The relief valve 56 can be a mechanical over-pressure valve that is mechanically configured to open when the pressure in the accumulator 54 exceeds the operating pressure or when the pressure exceeds the ambient pressure by more than a predetermined pressure interval. Alternatively, pressure sensors (not shown) can be used to monitor the pressure in the accumulator 54 and communicate with a pressure controller (not shown) that controls the venting of fluid through the relief valve 56. The accumulator 54 can also be vented after the store 12 has been jettisoned, either before or after the aircraft lands. For example, after the aircraft lands, a ground crew member can manually actuate the relief valve 56 to release the pressurized fluid from the accumulator 54.

The controller 90 is also in electrical communication with an ejection initiator, such as a store management system (SMS) 92 as is known in the art for controlling the release and jettison of stores, or a manual initiator switch (not shown) that is activated by a member of the aircraft crew. Upon activation, the ejection initiator issues the arm control signal to the controller 90, and the controller 90 releases the releasable seal 18 to pressurize the accumulator 54. When ejection of the stores 12 is desired, the ejection initiator issues an ejection control signal to the controller 90. The controller 90 receives the ejection control signal and actuates the dump valve 60 to the open position, thereby permitting pressurized fluid from the accumulator 54 to flow through port 82 into the piston chamber 81. The fluid drives the hook opening piston 80 downwardly to release the hooks 74, 76 while also flowing through the dump valve exit line 62 and the passages 72 to pressurize and drive each of the ejector pistons 86 to their extended positions. Thus, the fluid not only is the source of energy, but also the transfer mechanism to release the stores. The hooks 74, 76 release the store, and the ejector pistons 86 thrust the store 12 clear of the aircraft. As the hooks 74, 76 open, the store present switch 94 detects a "store absent" condition, which is transmitted to the controller 90. At the end of the ejector piston stroke, the vent ports 83 are exposed, as shown in FIG. 2, discharging substantially all residual accumulator pressure and permitting the springs 89 to retract the ejector pistons 86 to their retracted position.

Thus, according to one embodiment of the present invention, the pressure vessel is integral to the store and does not require power from the aircraft's electrical or hydraulic systems for pressurizing the fluid. Preferably, the pressure vessel provides a non-pyrotechnic fluid as the source of energy and transfer mechanism for jettisoning the store from the aircraft, and the pressure vessel provides the pressurized fluid to the ejection system without requiring a long time delay to achieve pressurization and without requiring the use of a pyrotechnic reaction, an on-board compressor, or an on-board storage container.

Many modifications and other embodiments of the inventions set forth herein will come to mind to one skilled in the art to which these inventions pertain having the benefit of the teachings presented in the foregoing descriptions and the associated drawings. For example, the controller 90 and the store management system (SMS) 92 can be a single device or each can comprise multiple components, as is known in the art. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A store ejection system for mounting a jettisonable store on an aircraft, the store ejection system using a fluid as a source of energy and a transfer mechanism and comprising:

a pressure vessel configured integral to the store, said pressure vessel capable of holding a pressurized non-pyrotechnic fluid for providing the source of energy and the transfer mechanism;

a releasable seal configured to hermetically and releasably seal said pressure vessel;

an actuation system comprising an accumulator releasably connected to said pressure vessel for receiving and storing the fluid from said pressure vessel, a dump valve for controlling a flow of fluid from said accumulator, and a controller for actuating said dump valve to an open position in response to a control signal to jettison the store; and a pneumatically-driven jettison mechanism for releasably retaining the store, said jettison mechanism fluidly connected to said dump valve such that actuating said dump valve to the open position releases the pressurized fluid in said accumulator to flow to said jettison mechanism, thereby actuating said jettison mechanism to jettison the store;

wherein said releasable seal is configured to hermetically seal said pressure vessel before said actuation system is connected to said pressure vessel and said actuation system is configured to be fluidly connected to said pressure vessel upon release of said releasable seal.

2. A store ejection system according to claim 1, further comprising a store present switch for detecting if a store is retained by said jettison mechanism, said store present switch configured to transmit a signal to the controller to indicate if a store is present.

3. A store ejection system according to claim 1, wherein said releasable seal comprises a valve.

4. A store ejection system according to claim 1, wherein said releasable seal comprises a burst portion.

5. A store ejection system according to claim 1, further comprising an actuator for releasing said releasable seal.

6. A store ejection system according to claim 5, further comprising a controller configured to receive an arm control signal and respond by actuating said actuator to release said releasable seal.

7. A store ejection system according to claim 1, wherein said pressure vessel defines an interior space of between about 20 and 50 cubic inches.

8. A store ejection system according to claim 1, wherein the fluid in said pressure vessel is a gas compressed to between about 3,000 and 10,000 psi.

9. A store ejection system according to claim 1, further comprising a quick disconnect connection device for releasably and fluidly connecting said pressure vessel to said actuation system.

10. A store ejection system according to claim 9, wherein said connection device comprises a flexible tube for fluidly connecting said pressure vessel to said accumulator.

11. A store ejection system according to claim 9, wherein said connection device comprises at least one electrical conductor for providing electrical communication between the aircraft and the store.

12. A store ejection system according to claim 1, wherein said actuation system further includes a relief valve configured to vent the fluid from said accumulator to reduce the pressure in said accumulator to below a maximum operating pressure.

13. A store ejection system according to claim 1, wherein said jettison mechanism further comprises at least one hook for releasably retaining the store, said hook being actuated to release the store by the pressurized fluid exiting said accumulator through said dump valve.

14. A store ejection system according to claim 13, wherein said jettison mechanism further comprises at least one ejector piston for forcibly jettisoning the store away from the aircraft when said hook has been actuated to a release position, said ejector piston being actuated to jettison the store by the pressurized fluid exiting said accumulator through said dump valve.

15. A store configured to be jettisoned from an aircraft using a fluid as a source of energy and a transfer mechanism, the store comprising:

a pressure vessel integral to the store, said pressure vessel capable of holding a pressurized non-pyrotechnic fluid for providing the source of energy and the transfer mechanism; and a releasable seal configured to hermetically and releasably seal said pressure vessel;

wherein said store is configured to be connected to the aircraft such that upon release of said releasable seal said pressure vessel is fluidly connected to an actuation system of the aircraft and the fluid flows from said pressure vessel to the actuation system.

16. A store according to claim 15, wherein said releasable seal comprises a valve.

17. A store according to claim 15, wherein said releasable seal comprises a burst portion.

18. A store according to claim 15, further comprising an actuator for releasing said releasable seal.

19. A store according to claim 18, further comprising an electrical connection configured to be connected to a quick disconnect connection device for electrically connecting said actuator to the aircraft.

20. A store according to claim 15, further comprising a pneumatic connection configured to be connected to a quick disconnect connection device for fluidly connecting said pressure vessel to the aircraft.

21. A store according to claim 15, wherein said pressure vessel defines an interior space of between about 20 and 50 cubic inches.

22. A store according to claim 15, wherein the fluid in said pressure vessel is a gas compressed to between about 3,000 and 10,000 psi.

23. A method of jettisoning a store from an aircraft using a pressurized non-pyrotechnic fluid from the store as a source of energy and a transfer mechanism, the method comprising:

releasably retaining the store with at least one pneumatically-driven jettison mechanism;

fluidly connecting an actuation system to a pressure vessel of the store;

releasing a releasable seal such that the pressure vessel is fluidly connected to an accumulator; and actuating a dump valve fluidly connected to the accumulator to an open position to fluidly connect the accumulator to the jettison mechanism such that the fluid flows from the accumulator to the jettison mechanism and thereby actuates the jettison mechanism to jettison the store with the pressure vessel.

24. A method of jettisoning a store according to claim 23, further comprising opening a relief valve fluidly connected to the accumulator to vent the fluid from the accumulator when an over-pressure condition is detected in the accumulator or when it is desired to disarm the jettison mechanism.

25. A method of jettisoning a store according to claim 23, further comprising prior to said connecting step pressurizing the pressure vessel and hermetically sealing the pressure vessel with the releasable seal.

26. A method of jettisoning a store according to claim 23, wherein said releasing step comprises destructively releasing a burst portion of the releasable seal.

27. A method of jettisoning a store according to claim 23, further comprising communicating an arm control signal to a controller and wherein the controller responds by initiating said releasing step.

28. A method of jettisoning a store according to claim 23, wherein said retaining step comprises releasably retaining the store with at least one hook and wherein said actuating step comprises actuating the hook to an open position to release the store.

29. A method of jettisoning a store according to claim 23, wherein said actuating step comprises fluidly connecting the accumulator to at least one ejector piston such that the fluid flowing from the accumulator actuates the at least one ejector piston to jettison the store.

\* \* \* \* \*